US007849368B2

(12) United States Patent
Srivastava et al.

(10) Patent No.: US 7,849,368 B2
(45) Date of Patent: *Dec. 7, 2010

(54) METHOD FOR MONITORING SERVER SUB-SYSTEM HEALTH

(75) Inventors: Rahul Srivastava, Randolph, NJ (US); Eric M. Halpern, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/100,970

(22) Filed: Apr. 10, 2008

(65) Prior Publication Data

US 2008/0215918 A1    Sep. 4, 2008

Related U.S. Application Data

(63) Continuation of application No. 10/340,227, filed on Jan. 10, 2003, now Pat. No. 7,373,556.

(60) Provisional application No. 60/359,010, filed on Feb. 22, 2002.

(51) Int. Cl.
*G06F 11/00* (2006.01)

(52) U.S. Cl. ........................................ 714/47

(58) Field of Classification Search ............... 714/1–4, 714/13, 15, 16, 18, 20, 21, 26, 27, 31, 37, 714/39, 47, 48
See application file for complete search history.

(56) References Cited

U.S. PATENT DOCUMENTS

| 5,293,024 | A | | 3/1994 | Sugahara |
| 5,367,670 | A | | 11/1994 | Ward |
| 5,432,715 | A | | 7/1995 | Shigematsu |
| 5,500,940 | A | * | 3/1996 | Skeie ........................ 714/25 |
| 5,638,514 | A | | 6/1997 | Yoshida |
| 5,819,028 | A | | 10/1998 | Manghirmalani et al. |
| 5,862,333 | A | | 1/1999 | Graf |
| 5,923,833 | A | | 7/1999 | Freund |
| 5,996,086 | A | | 11/1999 | Delaney et al. |
| 6,021,262 | A | | 2/2000 | Cote |
| 6,058,420 | A | | 5/2000 | Davies |

(Continued)

OTHER PUBLICATIONS

PCT International Report in connection with PCT/US03/04950 dated July 15, 2003, 7 pages.

(Continued)

*Primary Examiner*—Nadeem Iqbal
(74) *Attorney, Agent, or Firm*—Fliesler Meyer LLP

(57) ABSTRACT

A server self health monitor (SHM) system monitors the health of the server it resides on. The health of a server is determined by the health of all of a server's sub-systems and deployed applications. The SHM may make health check inquiries to server sub-systems periodically or based on external trigger events. The sub-systems perform self health checks on themselves and provide sub-system health information to requesting entities such as the SHM. Sub-systems self health updates may be based on internal events such as counters or changes in status or based on external entity requests. Corrective action may be performed upon sub-systems by the SHM depending on their health status or the health status of the server. Corrective action may also be performed by a sub-system upon itself.

20 Claims, 4 Drawing Sheets

U.S. PATENT DOCUMENTS

| | | | |
|---|---|---|---|
| 6,065,053 | A | 5/2000 | Nouri et al. |
| 6,070,253 | A | 5/2000 | Tavallaei |
| 6,085,243 | A | 7/2000 | Fletcher et al. |
| 6,170,067 | B1 | 1/2001 | Liu |
| 6,182,157 | B1 | 1/2001 | Schlener |
| 6,199,173 | B1 * | 3/2001 | Johnson et al. ............... 714/4 |
| 6,216,163 | B1 | 4/2001 | Bharali et al. |
| 6,249,885 | B1 | 6/2001 | Johnson et al. |
| 6,297,823 | B1 * | 10/2001 | Bharali et al. ............... 715/788 |
| 6,330,690 | B1 | 12/2001 | Nouri |
| 6,349,335 | B1 | 2/2002 | Jenney |
| 6,453,430 | B1 | 9/2002 | Singh |
| 6,457,142 | B1 | 9/2002 | Klemm |
| 6,467,054 | B1 | 10/2002 | Lenny |
| 6,493,749 | B2 | 12/2002 | Paxhia et al. |
| 6,553,515 | B1 | 4/2003 | Gross |
| 6,631,409 | B1 * | 10/2003 | Watson et al. ............... 709/224 |
| 6,681,342 | B2 | 1/2004 | Johnson et al. |
| 6,718,488 | B1 | 4/2004 | Jue et al. |
| 6,732,269 | B1 | 5/2004 | Baskey et al. |
| 6,738,811 | B1 * | 5/2004 | Liang ............... 709/224 |
| 6,742,139 | B1 | 5/2004 | Forsman et al. |
| 6,760,736 | B2 | 7/2004 | Waldo et al. |
| 6,785,840 | B1 | 8/2004 | Smith |
| 6,789,112 | B1 | 9/2004 | Freeman |
| 6,823,382 | B2 | 11/2004 | Stone |
| 6,859,834 | B1 | 2/2005 | Arora et al. |
| 6,874,020 | B1 | 3/2005 | Da Palma et al. |
| 6,874,106 | B2 | 3/2005 | Suzuyama |
| 6,883,120 | B1 | 4/2005 | Banga |
| 6,901,448 | B2 * | 5/2005 | Zhu et al. ............... 709/228 |
| 6,909,213 | B2 | 6/2005 | Frey |
| 6,925,645 | B2 | 8/2005 | Zhu et al. |
| 6,947,560 | B1 | 9/2005 | Smeets et al. |
| 7,000,193 | B1 | 2/2006 | Impink |
| 7,069,444 | B2 * | 6/2006 | Lowensohn et al. ......... 713/185 |
| 7,130,883 | B2 * | 10/2006 | Zhu et al. ............... 709/204 |
| 7,139,805 | B2 | 11/2006 | Seagren |
| 7,213,065 | B2 | 5/2007 | Watt |
| 7,225,249 | B1 | 5/2007 | Barry et al. |
| 7,233,989 | B2 | 6/2007 | Srivastava |
| 7,313,735 | B1 | 12/2007 | Levergood et al. |
| 2001/0044841 | A1 | 11/2001 | Kosugi |
| 2002/0007410 | A1 | 1/2002 | Seagren et al. |
| 2002/0016911 | A1 | 2/2002 | Chawla et al. |
| 2002/0091815 | A1 | 7/2002 | Anderson |
| 2002/0116151 | A1 | 8/2002 | Brown et al. |
| 2002/0156984 | A1 | 10/2002 | Padovano |
| 2003/0036886 | A1 | 2/2003 | Stone |
| 2003/0037289 | A1 | 2/2003 | Singh et al. |
| 2003/0055952 | A1 | 3/2003 | Motoyama et al. |
| 2003/0061340 | A1 | 3/2003 | Sun |
| 2003/0069953 | A1 | 4/2003 | Bottom |
| 2003/0105858 | A1 | 6/2003 | Hogg et al. |
| 2003/0131119 | A1 | 7/2003 | Noonan et al. |
| 2003/0167305 | A1 * | 9/2003 | Zhu et al. ............... 709/205 |
| 2003/0167418 | A1 | 9/2003 | Zhu et al. |
| 2003/0167421 | A1 | 9/2003 | Klemm |
| 2003/0191989 | A1 * | 10/2003 | O'Sullivan ............... 714/47 |
| 2004/0153866 | A1 * | 8/2004 | Guimbellot et al. ............ 714/47 |

OTHER PUBLICATIONS

Guiagoussou, et al., "A Java API for Advanced Faults Management", IEEE, 2001, 16 pages.

Sun Microsystems, "Java Mangement Extensions (JMX)", 1999, 2 pages.

BEA Systems, Inc., "Overview of Node Manager", BEA WebLogic Server 8.1 Documentation, Configuring and Managing WebLogic Server, http://edocs.ba.com/wls/docs81/adminguide/nodemgr.html, 2007, 10 pages.

BEA Systems, Inc., "Monitoring a WebLogic Server Domain", BEA WebLogic Server 8.1 Documentation, Configuring and Managing WebLogic Server, c:\\document~1 \EFISCH~1/LOCALS~1\Temp\94EOR52F.html, 2007, 16 pages.

* cited by examiner

METHOD FOR MONITORING SERVER SUB-SYSTEM HEALTH

CLAIM OF PRIORITY

This application is a continuation of U.S. patent application Ser. No. 10/340,227 entitled "METHOD FOR MONITORING A SUB-SYSTEM HEALTH," by Rahul Srivastava, et al., filed Jan. 10, 2003, which claims the benefit of U.S. Provisional Patent Application No. 60/359,010 filed Feb. 22, 2002, which applications are incorporated herein by reference.

CROSS REFERENCE TO RELATED APPLICATIONS

The present application is related to the following United States patents and patent applications, which patents/applications are assigned to the owner of the present invention, and which patents/applications are incorporated by reference herein in their entirety:

U.S. patent application Ser. No. 10/340,496, entitled "METHOD FOR INITIATING A SUB-SYSTEM HEALTH CHECK," filed on Jan. 10, 2003, currently pending, which claims priority to U.S. Provisional Application No. 60/359,010 entitled "SERVER SELF-HEALTH MONITOR," by Rahul Srivastava, et al., filed on Feb. 22, 2002;

U.S. patent application Ser. No. 10/340,002 entitled "SYSTEM FOR MONITORING A SUBSYSTEM HEALTH," filed on Jan. 10, 2003, currently pending, which claims priority to U.S. Provisional Application No. 60/359,010 entitled "SERVER SELF-HEALTH MONITOR," by Srivastava, et al., filed on Feb. 22, 2002;

U.S. patent application Ser. No. 10/339,469, entitled "METHOD FOR AUTOMATIC MONITORING OF MANAGED SERVER HEALTH," filed on Jan. 9, 2003 and issued as U.S. Pat. No. 7,233,989 on Jun. 19, 2007, which claims priority to U.S. Provisional Application No. 60/359,009 entitled "ECS NODE MANAGER FOR ENSURING HIGH AVAILABILITY SERVER AND APPLICATION," filed on Feb. 22, 2002;

U.S. patent application Ser. No. 10/338,981, entitled "METHOD FOR EVENT TRIGGERED MONITORING OF MANAGED SERVER HEALTH," filed on Jan. 9, 2003 and issued as U.S. Pat. No. 7,152,185 on Dec. 19, 2006, which claims priority to U.S. Provisional Application No. 60/359,009 entitled "ECS NODE MANAGER FOR ENSURING HIGH AVAILABILITY SERVER AND APPLICATION," filed on Feb. 22, 2002; and U.S. patent application Ser. No. 10/339,144, entitled "SYSTEM FOR MONITORING MANAGED SERVER HEALTH," filed on Jan. 9, 2003 and issued as U.S. Pat. No. 7,287,075 on Oct. 23, 2007, which claims priority to U.S. Provisional Application No. 60/359,009 entitled "ECS NODE MANAGER FOR ENSURING HIGH AVAILABILITY SERVER AND APPLICATION," filed on Feb. 22, 2002.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to managing a distributed network, and more particularly to monitoring the health of servers in a distributed network.

BACKGROUND OF THE INVENTION

Distributed networks of computers are widely known and used. These distributed networks distribute tasks, resources, and processing power among several servers. These servers interface with each other to accomplish tasks and perform transactions. Each server may handle different function such as management, data base maintenance, server shut down, server startup, and so forth. A server or managed server as used herein is intended to include computers, computer objects, applications, servers, or server instances.

As servers within a distributed network interact and perform transactions with each other, their operability and reliability become more important. If a server is inoperable or degenerate, it may effect the efficiency of the entire distributed network. A single degenerate server may waste time, money, and other server resources that are tied up in transactions with the degenerate server. For these reasons, minimizing server failure or server degeneration is desirable. Though a network may determine when a server has failed, the determination is a response to the server failure and often too late to prevent other resources from being affected. Further, valuable processing resources are often used up on monitoring servers and not on other important tasks.

What is needed is a system for server self-health monitoring that allows servers to determine their health status. The system should provide a method that efficiently monitors the health of a server while minimizing the strain on server processing resources.

SUMMARY OF THE INVENTION

In accordance with one embodiment of the present invention, a system is provided that allows a server to monitor its own health. The server's health is ascertained by determining the health of the server sub-systems. A server self health monitor resides on the server and monitors the servers sub-systems. The server self health monitor may monitor the health of a sub-system periodically or non-periodically. Upon determining its health, a server may provide its health information to requesting entities or perform maintenance and corrective action on its sub-systems.

Each sub-system may be required to determine its health upon the occurrence of a certain health check event. The event may occur internal or external to the sub-system. If the event occurs externally, the occurrence of the event is communicated to the sub-system in the form of a health check request or some other manner. In order to be monitored by the server self health monitor, server sub-systems may be required to register with the self health monitor at sub-system startup. Correspondingly, server sub-systems should also unregister with the self health monitor at sub-system shutdown. The sub-systems may communicate their health information to the server self health monitor or to requesting external entities. A sub-system may perform corrective action on itself based on the sub-system's health status.

DETAILED DESCRIPTION

A server self health monitoring system in accordance with the present invention monitors the health of the server it resides on and presents server health information to administrative clients external and internal to the server. The health of a server may be determined by assessing the health of all the sub-systems that reside on the server. The server sub-systems may provide their health information in response to a query from the server self health monitor or other triggering events. The server sub-systems may also interface with external administrative agents. A sub-system may perform corrective action and maintenance on itself. An external NM is configured to operate in conjunction with the sub-systems and enables the administrator to start and kill servers remotely from an Administration Console.

Figure 1:
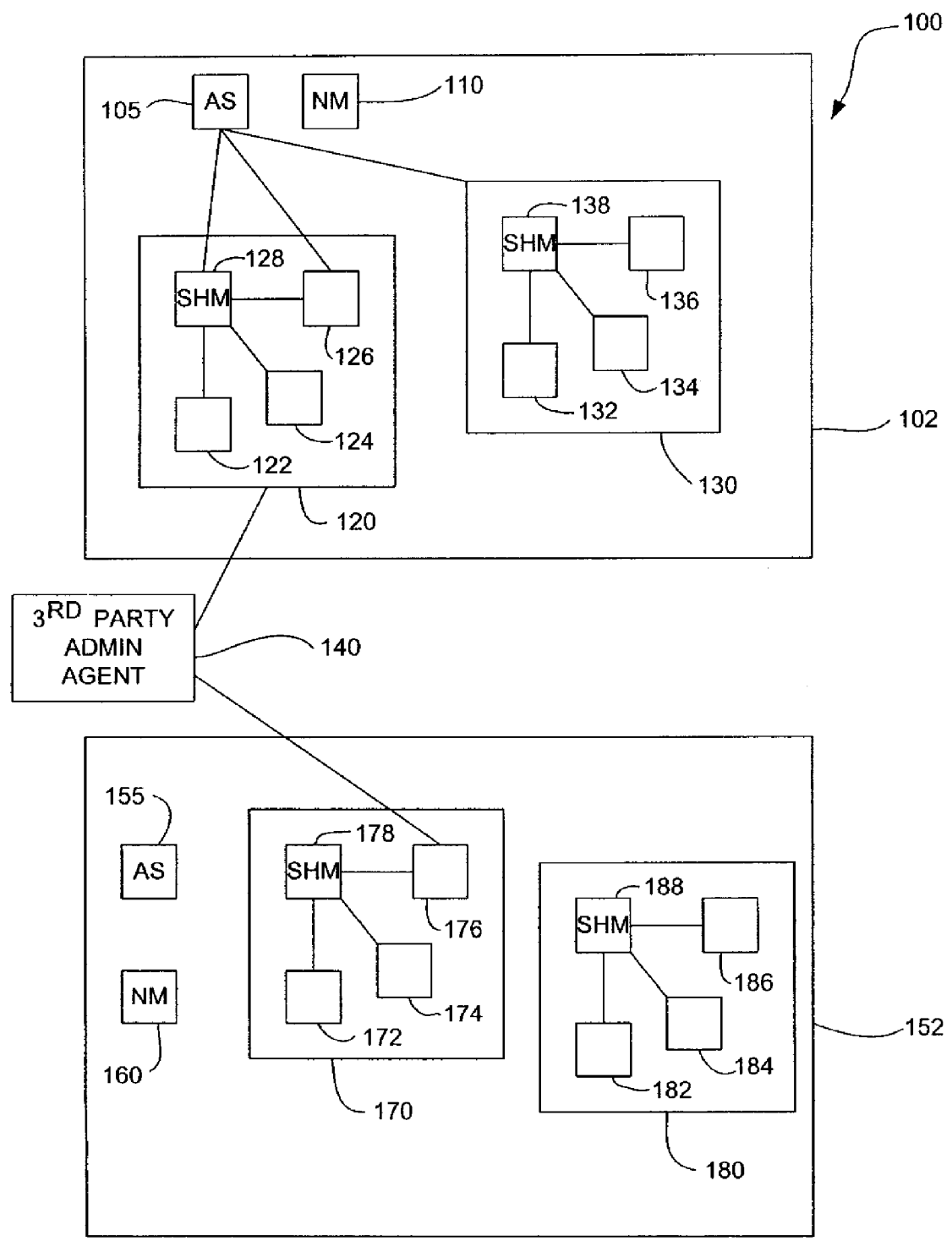
FIG. 1 is a block diagram of a self health monitoring system in accordance with one embodiment of the present invention.

A diagram of a server self health monitoring system 100 in accordance with one embodiment of the present invention is shown in FIG. 1. As shown in FIG. 1, server self health monitoring system 100 includes nodes 102 and 152 and a third party administrative agent 140. A node may contain one or more servers. The servers making up a node may be located on a single physical machine or be associated in some other way depending on the particular system. Node 102 includes servers 120 and 130, an administrative node (AS) 105, and a node manager (NM) 110. Server 120 includes server sub-systems 122, 124, and 126, and self health monitor (SHM) 128. A sub-system of a server as used herein is intended to include operational sub-systems of the server, applications deployed by the server, and other systems that originate from or have operations or functionality that can be traced to the particular server. The AS 105 may communicate with the SHM 128 or with a server sub-system directly, such as sub-system 126. The NM 110 may communicate with the AS 105 and the servers directly. Server 130 includes sub-systems 132, 134, and 136 and SHM 138. Node 152 includes AS 155, NM 160, and servers 170 and 180. Server 170 includes sub-systems 172, 174, and 176 and SHM 178. Server 180 includes sub-systems 182, 184, and 186 and SHM 188. The external administrative agent 140 may communicate with the sub-systems directly such as subsystem 122 or 176 or with an AS. Communication between the AS, sub-systems, SHM, and external administrative agents may occur through a JMX interface or some other means.

Figure 2:
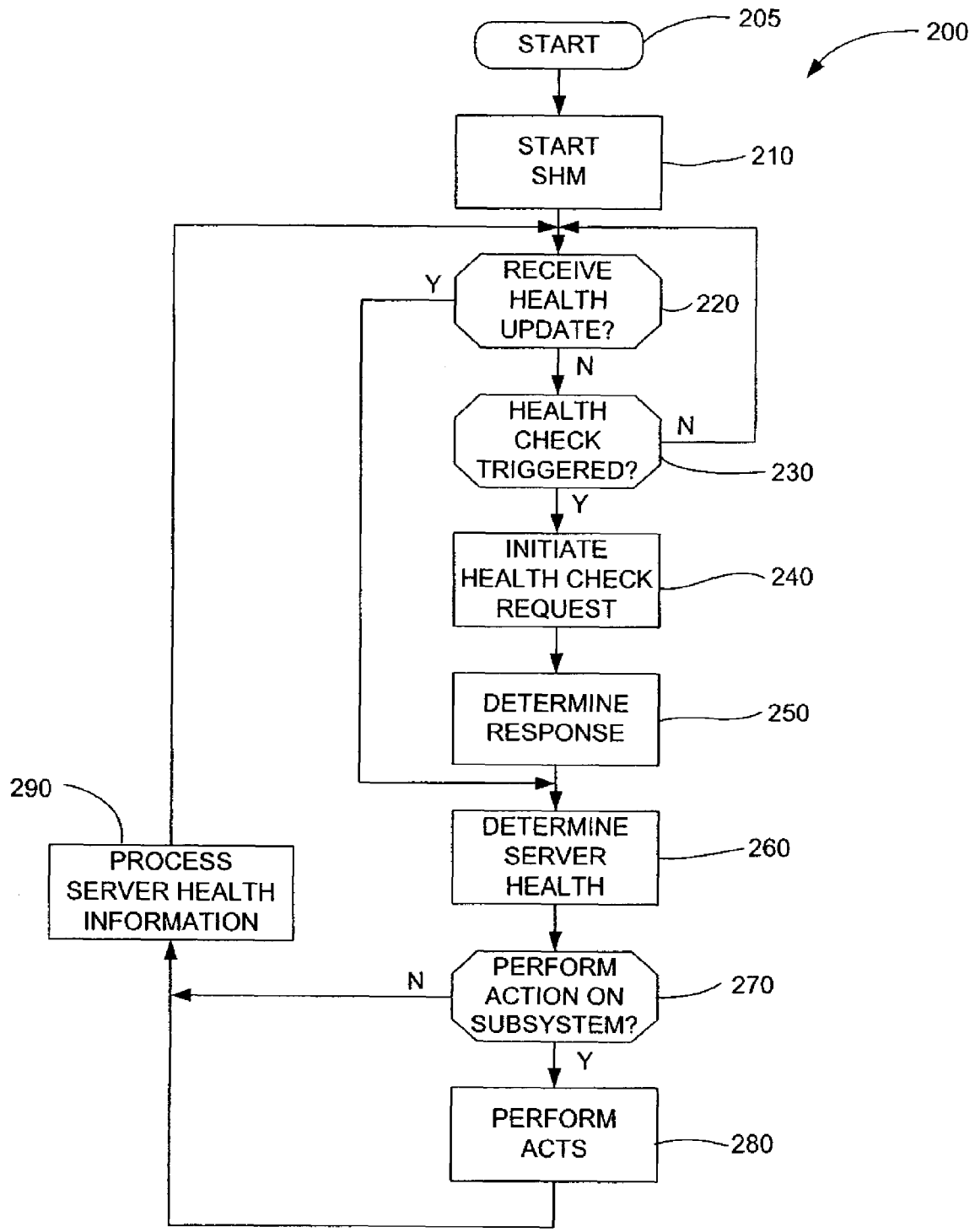
FIG. 2 is a diagram showing the operation of a self health monitor in accordance with one embodiment of the present invention.

The operation of SHM 128 of FIG. 1 is shown by the diagram 200 of FIG. 2. SHM operation begins with start step 205. Next, the SHM experiences startup in operation 210. At SHM startup, the SHM may receive messages from various sub-systems indicating that the subsystems should be monitored by the SHM. The sub-systems to be monitored may also indicate to the SHM whether they should be considered a critical sub-system. A critical sub-system is a sub-system that plays a more predominant role in determining the overall health of a server. In another embodiment of the present invention, the SHM determines whether a particular sub-system is a critical sub-system. The SHM may determine which subsystems are critical subsystems based on information received from the AS, the NM, a user, or the SHM. After start-up, the SHM determines if it has received any health updates in step 220. The SHM may receive health updates from sub-systems associated with the same server the SHM resides in. In one embodiment, the sub-systems may send the SHM a health update if there is a change in the sub-system's health status. In another embodiment, the sub-system may provide the SHM with a health update in response to a health update triggering event that occurs at the particular sub-system. Sub-system operation is discussed in more detail below with reference to FIG. 3.

The health update from a sub-system provides information regarding the health of the particular sub-system. In one embodiment, the health information may indicate the sub-system health is at one of multiple pre-defined levels. One level may correspond to the sub-system's health condition as being good. Another health level may correspond to the sub-system's condition as being failed. Other health levels may indicate that a sub-system's condition is somewhere between good and failed, such as a critical level or a warning level. Many variations of levels may be used to characterize the health of a subsystem, all of which are considered within the scope of the present invention. If the SHM receives a health update in step 220, operation proceeds to step 260. If no health information is received in step 220, operation continues to step 230.

The SHM determines whether a health check is triggered in step 230. A health check may be triggered for a single sub-system or multiple sub-systems simultaneously. In one embodiment, a health check is triggered periodically by the occurrence of an event. The period of time between health checks may be determined by a counter having a default value. In this case, a health check may be triggered whenever a period of time has elapsed that corresponds to the default value of the health check counter. In another embodiment, a user or other source may specify a value to be used in place of the default value. The counter may be located in the SHM or a location external to the SHM. In yet another embodiment, a health check may be triggered by a non-periodically occurring event. The non-periodical event may be a request from an external administrative agent or the AS or the occurrence of some other external event. If in step 230 no health check is triggered, operation returns to step 220.

If a health check is triggered in step 230, the SHM will initiate a health check request in step 240. The health check request may be directed to a single sub-system or multiple sub-systems. In one embodiment, the SHM generates and transmits the health check request to a sub-system directly. In another embodiment, the SHM initiates the health check request, and other server sub-systems generate and transmit the sub-system health check request. In step 250, the response from the sub-system to the sub-system health check is determined. In one embodiment, the response from the sub-system is received as a message transmitted from the sub-system to the SHM. The sub-system transmits a message from the sub-system in response to the health check request initiated by the SHM in step 240. The SHM may also determine that no response is received from the sub-system to be checked. This occurs if the sub-system is down, busy, or otherwise not responding. Once a response has been determined, operation continues to step 260.

Next, the health of a server is determined in step 260. In one embodiment, the health status of all the sub-systems in a server are used to determine the health of the server. If any critical sub-systems are deemed failed by the SHM, the server is deemed failed by the SHM. If no critical sub-systems are determined to be failed, then the server is determined to be in a healthy or "ok" state. After determining the health of the server in step 260, operation continues to step 270 where the SHM determines if any action is necessary. Action may be necessary depending on the response received in step 250. The necessary action may include shutting down a sub-system. In one embodiment, if no response is received from a sub-system in step 250, the sub-system is deemed failed and the SHM may shut down the non-responsive sub-system. If a critical sub-system is deemed to be in a failed state, the SHM may shut down the entire server. The SHM may also log any action or inaction taken by the SHM into a log file. If no action is necessary by the SHM, operation continues to step 290. If action is necessary in step 270, then operation continues to step 280. After performing any necessary acts in step 280, operation continues to step 290.

The SHM may process the health information for a sub-system in step 290. Processing sub-system health information may include storing the sub-system health information. In one embodiment, the sub-system health information is stored by setting state values corresponding to each sub-system's health. The state values may be written to local registers within the SHM or at some external location. If written to the SHM locally, the SHM may then provide the state values upon request by an external entity. External entities requesting the state values may include an AS, a third party server monitor, or a high availability framework. The SHM may also report a sub-system's health to some entity if a certain condition is met. For example, an entity may wish to have a sub-system's health reported to it when the health status of the sub-system changes. In this case, a subsystem's health would be determined at step 250. At step 290, the previous health status and current health status for a sub-system would be compared. If a change in health status was detected, an appropriate message would be sent to the requesting entity. After the server health status information is processed in step 290, operation returns to step 220.

Figure 3:
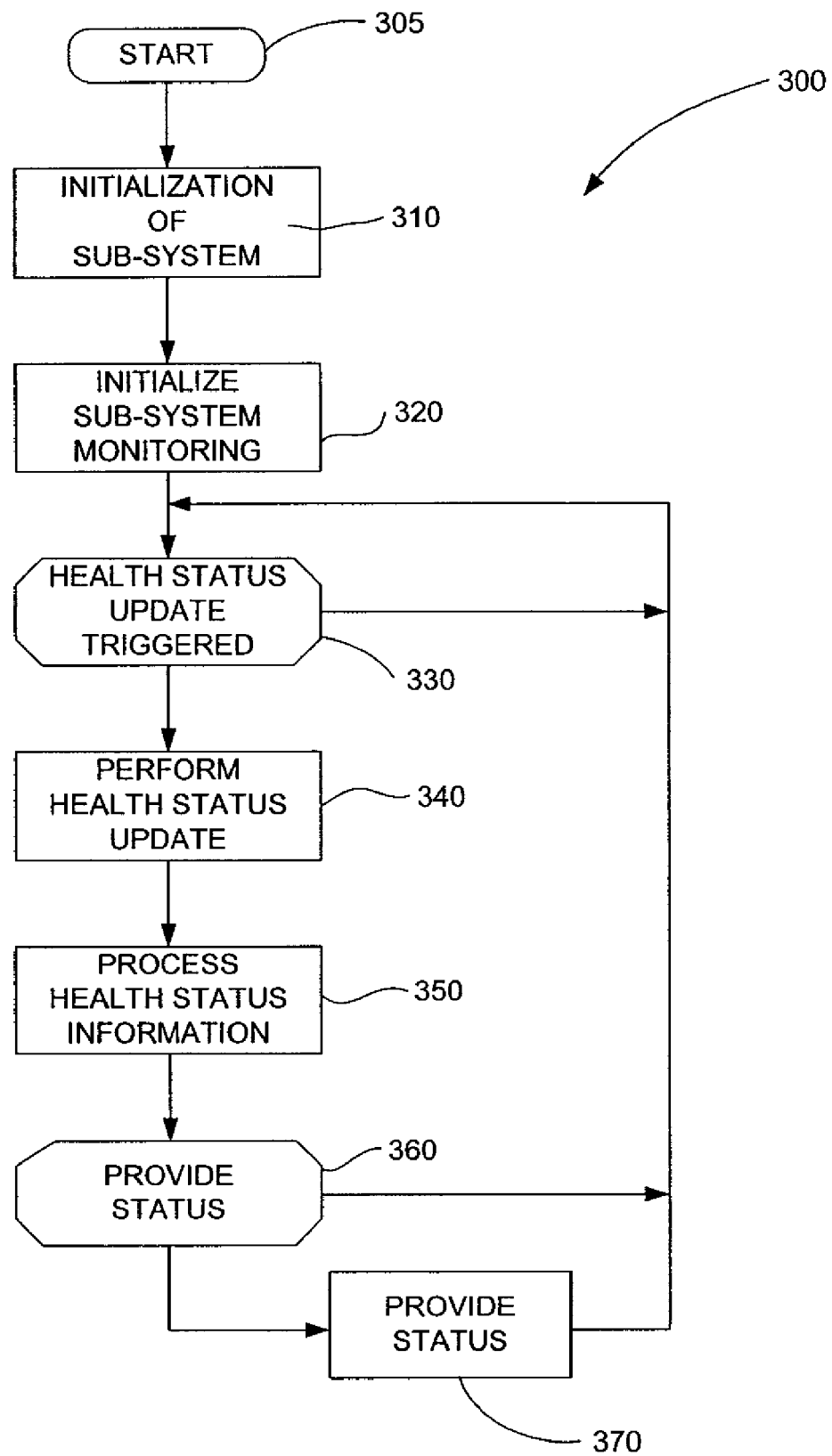
FIG. 3 is a diagram showing the operation of a sub-system within a self health monitoring system in accordance with one embodiment of the present invention.

The operation of a sub-system in accordance with one embodiment of the present invention is shown in diagram 300 of FIG. 3. System operation begins with start step 305. Next, the sub-system is initialized in step 310. Sub-system monitoring is then initialized in step 320. In one embodiment, each sub-system that wants to be monitored by the SHM will have a Runtime MBean implement a health feedback interface. The health feedback interface will include a particular method that can access a "HealthState" attribute. The health state attribute is added to the Runtime MBean. After initializing sub-system monitoring in step 320, the sub-system determines whether or not a health status update has been triggered in step 330. A health status update may be triggered by an event external to the sub-system or by an event that occurs internal to the sub-system. In the case of an external event, the occurrence of the event is communicated to the sub-system. An external triggering event may include a sub-system health update request from a requesting entity. The entity requesting the health status may be an AS, SHM, or other requesting entity. Internal triggering events may vary from sub-system to sub-system. In one embodiment, an internal event may be the expiration of a period of time. The period of time may be controlled by a counter. Thus, the expiration of the counter time period may trigger the health check. The counter may have a default value that can be over-ridden by a user. A health status update triggering event may also be a change in the status of the sub-system. Change in status triggering events will vary from sub-system to sub-system. For example, a JDA subsystem may reside on a server. When a user wishes to start a transaction, the JDA sub-system writes to a TLOG file. If the memory disk is full or the transaction log is unavailable, the sub-system may trigger a TLOG error. This in turn may trigger a health status update by the JDA subsystem. In addition to the JDA example, different sub-systems may trigger a health check in a different manner. If a health status update has not been triggered in step 330, then operation loops to remain at step 330.

If a health status update has been triggered in step 330, then operation continues to step 340. In step 340, the sub-system will perform a health status update on itself. In one embodiment, a sub-system's health status can be represented as one of multiple levels. One level may indicate that the sub-system's health is good. Another sub-system health level may indicate that the sub-system's health status is failed. Other sub-system health levels may be used to characterize the sub-system's health level when it resides somewhere between good and failed, such as a critical level or a warn level. It is understood that the number and characterization of health levels may vary depending on the needs of the sub-system. These variations are all within the scope of the present invention. In another embodiment of the present invention, the health status update at step 340 may involve making a health state adjustment according to pre-determined criteria instead of detecting the current state. For example, a sub-system may have health state adjustment criteria requiring the sub-system to be placed into a critical state if a certain number of transactions with the sub-system have timed out. In this case, the sub-system would be placed in a critical state if the minimum number of transactions occurred. This health state adjustment may occur even though a health status update may have returned a different health level. The criteria for a sub-system health state adjustment may be preset by a sub-system or specified by a user.

After the sub-system has performed a health status update in step 340, the sub-system may process the health status information in step 350. As understood by those skilled in the art, different sub-systems will process their health information in different ways. In one embodiment, the sub-system may perform recovery or corrective action if the sub-system's health status is not acceptable. As health level characterizations may vary between different sub-systems, the sub-system corrective action may vary as well. In one embodiment, corrective action may include restarting the sub-system. Other processing corresponding to the health status may include storing the sub-system health information. In one embodiment of the present invention, storing sub-system health information by a sub-system includes updating an internal health status value. Processing health information may also include restarting a counter to determine the next health check, writing to a log file, or some other action. After processing the health status information in step 350, the sub-system determines if it should provide it's health status to another entity in step 360. The sub-system may provide health status to another entity if the entity requested the health status of the sub-system. Entities that may inquire about the sub-system's health include the SHM, AS, and external administrative agents. In one embodiment of the present invention, all sub-systems report their health level as good or failed. This occurs despite the multiple health levels a sub-system may utilize to assess it's health internally and perform corrective action on itself. If the sub-system does not need to provide it's health status to any entity, operation continues to step 330. If the sub-system does need to provide the health status to an entity, operation continues to step 370. In step 370, the sub-system provides it's health status to an entity.

After step 370 is complete, operation continues to step 330 where the sub-system waits for another health status update triggering event to occur.

Figure 4:
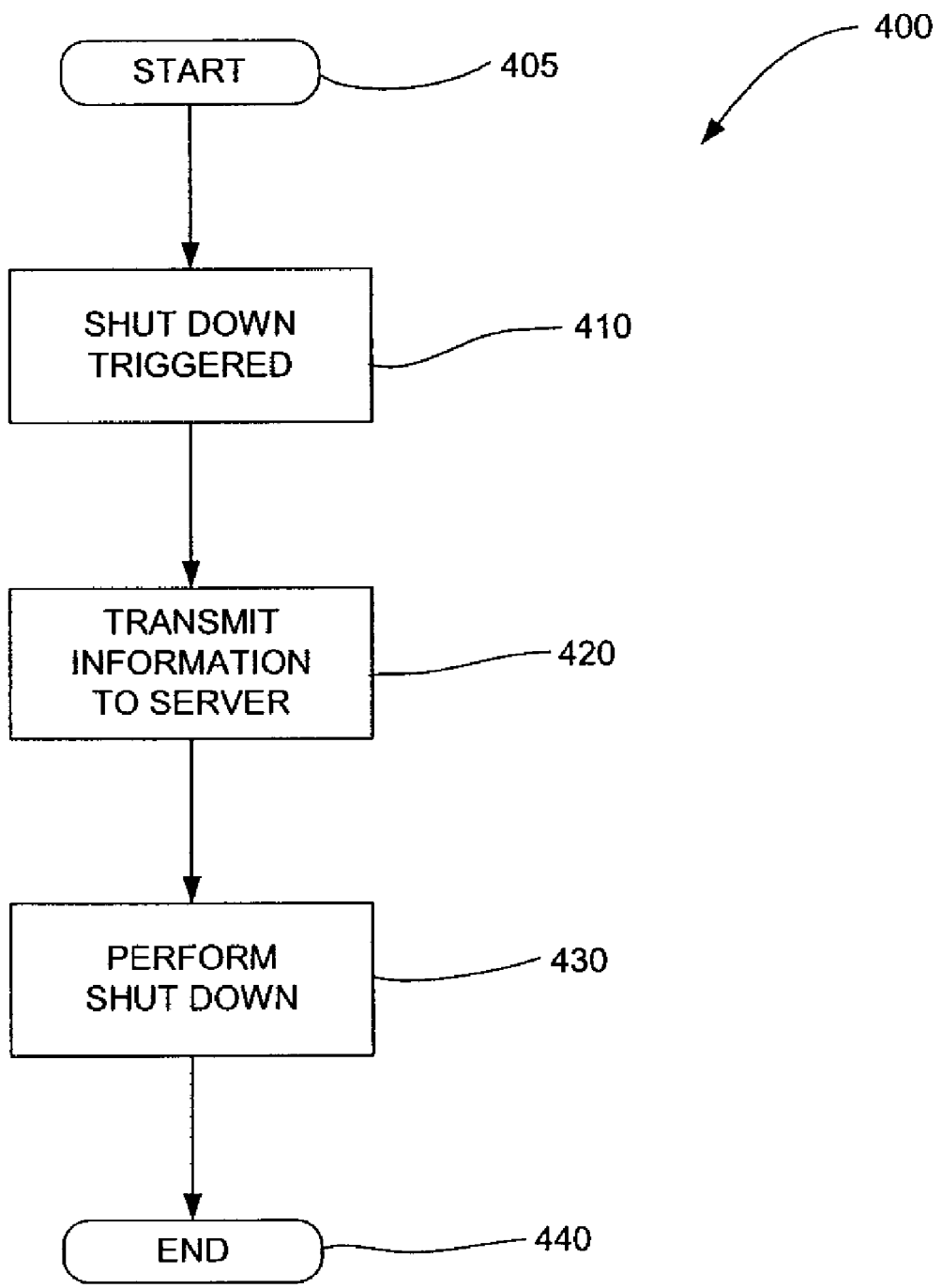
FIG. 4 is a diagram showing the operation of a sub-system within a self health monitoring system experiencing shut-down in accordance with one embodiment of the present invention.

A sub-system in a self health monitoring system may have to be shut down. This may take place as part of maintenance or corrective action initiated by either the SHM or the sub-system itself. The operation of a sub-system going through shut-down in accordance with one embodiment of the present invention is shown in diagram 400 of FIG. 4. The operation of a sub-system being shutdown begins with start step 400. Next, a triggering event begins the shutdown procedure in step 410. The triggering event may occur within the sub-system, within the SHM, or some other location. If the triggering event occurs externally to the sub-system, the occurrence of the event is communicated to the sub-system. Next, the sub-system transmits information to the server it resides on. In one embodiment, the sub-system transmits information to the SHM that resides on the server. The information may include information that unregisters the sub-system from server health monitoring. After transmitting information to the server, the sub-system performs shut-down in step 430. After performing shutdown, operation of the sub-system ends in step 440.

As shown in FIG. 1, the NM may communicate with servers and with the AS. In one embodiment, the NM will continuously monitor servers running on the local machine and may automatically detect and restart failed servers. This detection and restart will occur as soon as the NM detects the server failure. NM Runtime MBeans implemented in java may be hosted on the Admin Server that offer methods to access and complement NM functionality as well as to expose the health information collected by NM.

In one embodiment, the NM continuously and automatically monitors servers running on the local machine and automatically detects and restarts failed Servers. This detection and restart occur as soon as possible after the server failure. Once a server failure is detected, an NM may be controlled according to these parameters:

AutoRestartEnabled=<true|false>

Specifies whether Servers are restartable or not. Default is true.

RestartIntervalSeconds=<number of seconds>

If a Server is restartable, this parameter specifies that it can be restarted RestartMax times within the specified number of seconds. In one embodiment, the default is 3600 seconds (60 minutes).

RestartMax=<number>

If Servers are restartable, this parameter specifies the max # times a Server can be started within the period specified by RestartIntervalSeconds. In one embodiment, the default is 2.

These parameters will be defined per Server instance. They will also be modifiable at runtime via the Admin Console. Certain methods may be provided to access or modify the parameters. The methods can be added to a weblogic.management.configuration.ServerMBean and may include the following:

boolean getAutoRestartEnabled( );
void setAutoRestartEnabled(boolean);
int getRestartIntervalSeconds( );
void setRestartIntervalSeconds(int);
int getRestartMax( );
void setRestartMax(int);

In another embodiment, the NM may periodically make a request for the health status of a server. After determining the health status of a server, the NM may take action with the server, including restart the server. In one embodiment, the server health check performed by the NM may be controlled by these example parameters:

HealthCheckIntervalSeconds=<number of seconds>

The interval of time (in seconds) between which periodic scans are done by NM to check if Servers are Failed. In one embodiment, the default is 180 seconds.

HealthCheckTimeoutSeconds=<number of seconds>

The length of time (in seconds) the Node Manager will wait for a response to the health check query after which it will deem the monitored server Failed. In one embodiment, the default is 60 seconds.

AutoKillIfFailedEnabled=<true|false>

If a Server is deemed Failed, this parameter will control whether NM will kill the Server or not. In one embodiment, the default is false.

In one embodiment, the parameters HealthCheckIntervalSeconds, HealthCheckTimeoutSeconds, and other parameters will be defined per NM instance, and can be specified on the NM command line.

The startup period for a server depends upon many factors, including the applications being deployed on the server. In one embodiment, the NM will wait for a Server to complete its startup before the NM starts monitoring the server. This wait time can be specified using the following parameter:

HealthCheckStartDelaySeconds=<number of seconds>

The length of time (in seconds) the NM will wait before starting its monitoring of the Server. In one embodiment, the default is 120 seconds.

In one embodiment, this feature includes an administrative interface. The new parameters for the server can be modified at runtime through the Admin Console. The methods will be added to the ServerMBean to access or modify these parameters:

boolean getAutoKillIfFailedEnabled( );
void setAutoKillIfFailedEnabled(boolean);
int getHealthCheckStartDelaySeconds( );
void setHealthCheckStartDelaySeconds(int secs);

In one embodiment, the functionality of the NM is implemented through java MBeans. These MBeans have several purposes. One purpose is to expose the functionality of the NM to external administrative clients. The MBeans may allow external administrative clients ($3^{rd}$ party application monitors, HA frameworks, etc.) to start and kill servers using the NM without using the admin console, thereby providing a programmatic interface to NM's functionality. Another purpose of the MBeans is to expose the NM view of server health. As the NM periodically collects health information on servers, internal or external administrative clients may access the health information through the NM. Thus, the MBeans may provide an interface to server health information for administrative clients.

The MBeans in one embodiment of the present invention may have external interface requirements. For example, public interface NodeManagerRuntimeMBean may extend the MBean WebLogic.management.runtime.RuntimeMBean and include the following methods.

java.io.Reader start(ServerMBean server) throws NodeManagerException;

This method may start the specified server and return the reader to local log file containing the output of the executed command. If an error occurs, the method throws NodeManagerException.

java.io.Reader startInStandby(ServerMBean server) throws NodeManagerException;

This method may start the specified server in standby state and return the reader to a local log file containing the output of the executed command. If an error occurs, the method throws NodeManagerException.

java.io.Reader shutdown(ServerMBean server) throws NodeManagerException;

This method shuts down the specified server and returns the reader to local log file containing the output of the executed command. If an error occurs, the method throws NodeManagerException.

java.io.Reader kill(ServerMBean server) throws NodeManagerException;

This method kills the specified server. The method may be used to kill the server process when the server does not respond to a shutdown operation. After killing the server, the method returns the reader to the local log file containing the output of an executed command. If an error occurs, the method throws NodeManagerException.

java.io.Reader startMonitoring(ServerMBean server) throws NodeManagerException;

This method instructs the NM to start monitoring the specified server. The NM will automatically restart the server if the server crashes (if AutoRestartEnabled is set to true) or enters a failed state (if AutoKillIfFailedEnabled and AutoRestartEnabled are set to true). The method then returns the reader to a local log file containing the output of the executed command. If an error occurs, the method throws NodeManagerException.

java.io.Reader stopMonitoring(ServerMBean server) throws NodeManagerException;

This method instructs the NM to stop monitoring the specified server and returns the reader to a local log file containing the output of the executed command. If an error occurs, the method throws NodeManagerException.

java.io.Reader getLogs(ServerMBean server, String type) throws NodeManagerException;

This method retrieves logs from the NM for the specified server. In one embodiment, the type may be either "WL_output" or "WL_error". The method then returns the reader to the log retrieved. If an error occurs, the method throws NodeManagerException.

String getState(ServerMBean server) throws NodeManagerException;

This method operates to query the NM for its view of the state for a specified server. In one embodiment, the method is used when server does not respond to queries to its ServerRuntimeMBean.

The method will return "Unknown" if the NM is either not monitoring or does not have any knowledge of the server. If an error occurs, the method throws NodeManagerException.

The NM will periodically poll the server to check its health. In one embodiment of the present invention, the algorithm used for polling the server is as follows. Upon startup, the NM reads an on-disk file to retrieve information on servers it was monitoring during its previous incarnation. The NM assumes that all of the monitored servers are alive when it starts up. It assumes no knowledge of their current states and sets its view of their state to "Unknown". Next, the NM invokes an NMCommandServlet deployed on the Server. This is an asynchronous servlet that will return the server's health information after HealthCheckIntervalSeconds has elapsed. Once the NM invokes the servlet, either an IOException is thrown or the server returns its State value after HealthCheckIntervalSeconds.

In one embodiment, an IOException could mean the server has crashed or is not running, the server too busy to accept TCP connection, the server has Failed, the server is unable to accept a TCP connection, or a transient IO exception has occurred. These examples are treated as if the server has failed, wherein the NM sets its internal value of server state to "failed". In one embodiment, the NM handle "false negatives" by attempting to kill the Server. If the Server's AutoKillIfFailedEnabled parameter is "true", NM sets its internal value of Server state to "Failed" and kills the Server. If AutoKillIfFailedEnabled is false, NM sets it internal value of Server state to "Failed Not Restartable", logs a warning and continues. If the server returns its state value after HealthCheckIntervalSeconds, the server is either running or failed. If the server is failed and the Server's AutoKillIfFailedEnabled parameter is "true", NM sets its internal value of Server state to "Failed" and kills the Server. If AutoKillIfFailedEnabled is false, NM sets it internal value of Server state to "Failed Not Restartable", logs a warning and continues.

Next, if NM sees that its interval value of Server state is "failed", it will try to restart the server. The NM then checks the server's AutoRestartEnabled parameter. If the parameter is true and less than RestartMax restarts have been performed in the current RestartIntervalSeconds window, the NM will restart the server. If server has already been restarted RestartMax times in the current RestartIntervalSeconds window, the NM will wait till the next RestartIntervalSeconds window begins before performing another restart. If AutoRestartEnabled is false, NM will not restart the server.

In one embodiment, the servers may initiate contact with the NM. For example, a server may inform the NM when certain transitions occur in the state value of server. This will be particularly useful when the NM starts a server and when the server fails. When the NM starts a server, the server will inform the NM once it has entered a standby state. If a server fails, the server will inform the NM as soon as it has entered a failed state. Notification of entering the failed state is achieved by passing the listening address of the NM to the server at server startup.

The java implementation of the NM functionality may have an effect on certain clients, such as JMX clients. JMX clients (like the Admin Console) will be accessing one or more server lifecycle MBeans to perform server lifecycle operations. The server lifecycle MBeans have a different interface than the server configuration MBeans. Detailed below are the changed semantics:

Operations such as "start" and "shutdown" will return precise information on their success or failure. They will throw an exception if the operation fails.

Operations on the NM Runtime MBeans are now blocking. A TaskMBean interface is provided around the server Lifecycle MBeans to provide an asynchronous interface to JMX clients.

The server lifecycle and NM runtime MBeans provide a rich set of functionality. JMX clients can make use of these to perform a wide variety of Server lifecycle and health monitoring control operations.

The NM and server lifecycle entities interact during each of the Server Lifecycle state transitions. Examples of these interactions are shown below. Admin console, weblogic.Admin command line utility and other Admin Clients will be effecting these state transitions by invoking methods on the ServerLifecycleRuntimeMBean.

start( ) [SHUTDOWN->RUNNING]
startInStandby( ) [SHUTDOWN->STANDBY]
ServerLifecycleRuntimeMBean hosted on the Admin Server will invoke the start( ) or startInStandby( ) methods on the corresponding NodeManagerRuntimeMBean.

shutdown( ) [STANDBY->SHUTDOWN]
If a NM is configured, ServerLifecycleRuntimeMBean hosted on the Admin Server will invoke the shutdown( ) method on the corresponding NodeManagerRuntimeMBean.

If not, it will invoke the shutdown( ) method on the ServerLifecycleRuntimeMBean hosted on the Managed Server.

getState( )

ServerLifecycleRuntimeMBean hosted on the Managed Server will return the State attribute of the Server.

ServerLifecycleRuntimeMBean hosted on the Admin Server will invoke the getState( ) method on the ServerLifecycleRuntimeMBean hosted on the Managed Server. If this operation times out, it will then invoke the getState( ) method on the NodeManagerRuntimeMBean.

In addition to communication between the NM and the servers, the NM also communicates with the Administration Server (AS). In one embodiment, all data being sent over the network link between the AS and NM will be encrypted using a scheme based on the Diffie-Hellman algorithm. In one embodiment, the encryption parameters are negotiated at link establishment time and will depend upon configuration parameters and installed encryption software. The Admin Server and NM will be authenticated with each other using a shared secret based mechanism.

In general, the AS begins the communication session between the AS and the NM. Both the NM and the AS are aware of the encryption feature, and have two configuration parameters. The first configuration parameter is the minimum encryption level a process will accept. The minimum encryption is expressed as a key length having a 0, 40, or 128 bits. The second configuration parameter is the maximum encryption level a process is willing to support. The maximum encryption level is also is expressed as having a 0, 40, or 128 bit key size. The two parameters are denoted as (min, max). Thus, (40, 128) means a process will accept at least a 40-bit encryption but desires 128-bit if possible.

Encryption parameters negotiated are for the lifetime of the communication session.

The first step in encryption key size negotiation is for the two processes to agree on the largest common key size supported by both the NM and the AS. This negotiation itself need not be encrypted or hidden. A pre-processing step temporarily reduces the maximum key size parameter configured to agree with the installed software's capabilities. In one embodiment, this can be done at link negotiation time, because at configuration time it may not be possible to verify a particular machine's installed encryption package. For example, the administrator may configure (0, 128) encryption for an unbooted machine that only has a 40-bit encryption package installed. When the machine actually negotiates a key size, it should represent itself as (0, 40). In some cases this may cause a run-time error; for example (128, 128) is not possible with a 40-bit encryption package.

The following table shows how the configured parameters are modified based on which encryption package is installed. This is a local computation that each process performs itself. The result serves as input for the subsequent cross-machine negotiation.

| configured parameters (min, max) | no encryption package installed | 40-bit encryption package installed | 128-bit encryption package installed |
|---|---|---|---|
| 0, 0 | 0, 0 | 0, 0 | 0, 0 |
| 0, 40 | 0, 0 | 0, 40 | 0, 40 |
| 0, 128 | 0, 0 | 0, 40, | 0, 128 |
| 40, 40 | error | 40, 40 | 40, 40 |

-continued

| configured parameters (min, max) | no encryption package installed | 40-bit encryption package installed | 128-bit encryption package installed |
|---|---|---|---|
| 40, 128 | error | 40, 40 | 40, 128 |
| 128, 128 | error | error | 128, 128 |

Next the two processes jointly agree on the largest key size acceptable to both. It may be that there is no overlap, in which case network link establishment fails (with an appropriate log error message).

This table shows the outcome for all possible combinations of min/max parameters:

|  | 0, 0 | 0, 40 | 0, 128 | 40, 40 | 40, 128 | 128, 128 |
|---|---|---|---|---|---|---|
| 0, 0 | 0 | 0 | 0 | error | error | error |
| 0, 40 | 0 | 40 | 40 | 40 | 40 | error |
| 0, 128 | 0 | 40 | 128 | 40 | 128 | 128 |
| 40, 40 | error | 40 | 40 | 40 | 40 | error |
| 40, 128 | error | 40 | 128 | 40 | 128 | 128 |
| 128, 128 | error | error | 128 | error | 128 | 128 |

Two session keys will be generated for the encrypted network link using the Diffie-Hellman algorithm. One session key will be used for data flowing from the Admin Server to the NM, and the other key will be used for traffic flowing in the reverse direction. The generated session keys will always be 128-bit.

In one embodiment, input parameters to the Diffie-Hellman key agreement algorithm can be fixed (burned-in to software). The AS will then transmit the parameters it wants to use to the NM.

Diffie-Hellman session key agreement also requires a cryptographically secure pseudo-random number source. The seed value for the pseudo-random number generator must contain a large amount of unpredictable data, so that a network-based attacker cannot iterate through likely seed values.

If a 40-bit key size is negotiated, the 128-bit session key produced by Diffie-Hellman should be used for RC4 bulk encryption. However, 88 bits must be disclosed in the clear in one of the link establishment messages. Security is better than with a simple 40-bit key, because the 88-bits act as salt and prevent an attacker from using pre-computed lookup tables.

A network attacker may not be permitted to defeat the 88-bit disclosure requirement by tampering with packets or deleting packets. The actual bits disclosed in the clear must be used by the Admin Server. If they do not agree with the locally computed Diffie-Hellman session key, or are not supplied as expected, Admin Server will generate a log error message and terminate the connection.

Both the processes implicitly agree to permute their Diffie-Hellman session key when 40-bit encryption is negotiated. This prevents a network attacker from tampering with messages and tricking the Admin Server into a 128-bit session when 40-bit was the NM s negotiation result.

In one embodiment, the AS and NM will be authenticated using a shared secret. The steps to authenticate a shared secret are as follows:

Both the AS and NM generate a 128-bit MD5 message digest (fingerprint) using the send and receive session keys negotiated.

The AS will generate a 64-bit random number (challenge). It will then DES-encrypt the challenge and the fingerprint using its password as the key and send this to the NM.

The NM will decrypt the received message with the AS password. If the fingerprints don't match, it will reject the authentication request.

The NM will generate a 64-bit session key. The NM will then DES-encrypt the previously-received challenge, the generated session key and the fingerprint using its password as the key and send this to the AS.

The AS will decrypt the received message with the NM password. It will check the received challenge and fingerprint with its local values. If either doesn't match, it will reject the authentication request.

If the above sequence is completed successfully, the AS and NM will be considered authenticated with each other.

In one embodiment, the NM has external interface configurations relating to the authentication/encryption scheme. Examples of the command line arguments that can be specified for the Admin Server are below.

WebLogic.management.minEncryptionBits=<number>

This argument specifies the minimum encryption level the process will accept. In one embodiment, possible values are 0, 40, 128, and the default value is 0.

WebLogic.management.maxEncryptionBits=<number>

This argument specifies the maximum encryption level the process will accept. In one embodiment, possible values are 0, 40, 128, and the default value is 128.

WebLogic.management.enableChannelBinding=0|1

This argument specifies a value of 1 enables the Authentication Protocol. In one embodiment, the default is 0.

WebLogic.management.passwordKey=<string>

This argument specifies a key to be used to decrypt the encrypted NM passwords stored in the configuration file. In one embodiment, it must be specified if WebLogic.management.enableChannelBinding is set to 1.

The utility WebLogic.wtc.gwt.genpasswd will be used to encrypt NM passwords to be stored in the configuration file. These new command line arguments will be specified for the NM. These new arguments will be modifiable at runtime via the Admin Console.

WebLogic.nodemanager.minEncryptionBits=<number>

This argument specifies the minimum encryption level the process will accept. In one embodiment, possible values are 0, 40, 128 and the default value is 0.

WebLogic.nodemanager.maxEncryptionBits=<number>

This argument specifies the Maximum encryption level the process will accept. In one embodiment, possible values are 0, 40, 12 and the default value is 128.

WebLogic.nodemanager.enableChannelBinding=0|1

This argument specifies a value of 1 enables the Authentication Protocol (Section 5.2.7). In one embodiment, the default is 0.

WebLogic. nodemanager.password=<string>

This argument specifies the NM s password. In one embodiment, the NM password must be specified if WebLogic.nodemanager.enableChannelBinding is set to 1.

WebLogic.nodemanager.adminServerPassword=<string>

This argument specifies the Admin Servers password. In one embodiment, the AS password must be specifiedWebLogic.nodemanager.enableChannelBinding is set to 1.

A server self health monitor system monitors the health of the server it resides on. The health of a server is determined by the health of all the server sub-systems and deployed applications. The SHM may make health check inquiries to server sub-systems periodically or based on external trigger events. The sub-systems perform self health checks on themselves and provide sub-system health information to requesting entities such as the SHM. Sub-system self health updates may be based on internal events such as counters, changes in status, or external entity requests. Corrective action may be performed upon sub-systems by the SHM depending on their health status or the health status of the server. Corrective action may also be performed by a sub-system upon itself.

Examples considered within the scope and spirit of the present invention are included in an Appendix to this application.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Appendix

1 Product Perspective (O)

The existing NM implementation enables the administrator to start and kill Servers remotely from the Administration Console. However, there is no automatic monitoring or restart of these Servers after that.

The goal of this release is to improve the availability of these Servers by monitoring them and automatically restarting them if necessary.

In addition, NM's functionality and information will be exposed to JMX clients via new runtime MBeans.

1.1 Product Functions (O)

1.1.1 Automatic Detection and Restart of Crashed Servers

NM will continuously monitor Servers running on the local machine and will automatically detect and restart failed Servers. This detection and restart will occur as soon as NM detects the Server failure.

1.1.2 Monitoring and Restart of Failed Servers

NM will periodically monitor Servers running on the local machine and will automatically detect and restart Failed Servers. This detection and restart will occur as soon as possible after the Server is deemed to be Failed.

1.1.3 Node Manager Runtime MBeans

New Node Manager Runtime MBeans will be provided. They will be hosted on the Admin Server and will offer methods that wrap NM functionality and expose the health information collected by NM.

2 Automatic Detection and Restart of Failed Servers

2.1 Functional Description

NM will continuously monitor Servers running on the local machine and will automatically detect and restart failed Servers. This detection and restart will occur as soon as NM detects the Server failure.

2.2 Functional Requirements

NM will continuously monitor Servers running on the local machine and will automatically detect and restart failed Servers. This detection and restart will occur as soon as possible after the Server failure.

Once a Server failure is detected, NM's actions will be controlled by these parameters:

AutoRestartEnabled=<true|false>
    Specifies whether Servers are restartable or not. Default is true.

RestartIntervalSeconds=<number of seconds>
    If a Server is restartable, this parameter specifies that it can be restarted RestartMax times within the specified number of seconds. Default is 3600 seconds (60 minutes).

RestartMax=<number>
    If Servers are restartable, this parameter specifies the max # times a Server can be started within the period specified by RestartIntervalSeconds. Default is 2.

These parameters will be defined per Server instance. They will also be modifiable at runtime via the Admin Console.

2.3 Software Interfaces (Javadoc, MBean, Objects, Classes)

This feature has only an administrative interface, and it is via the new parameters described in section 3.2.

These new parameters for the Server will be modifiable at runtime via the Admin Console.

These methods will be added to the weblogic.management.configuration.ServerMBean to access or modify these parameters:
boolean getAutoRestartEnabled( );
void setAutoRestartEnabled(boolean);
int getRestartIntervalSeconds( );
void setRestartIntervalSeconds(int);
int getRestartMax( );
void setRestartMax(int);

3. Monitoring and Restart of Failed Servers

3.1 Functional Description

NM will periodically monitor Servers running on the local machine and will automatically detect and restart Failed Servers. This detection and restart will occur as soon as possible after the Server is deemed to be Failed.

3.2 Functional Requirements

NM will periodically check Servers running on the local machine and will automatically detect and restart Failed Servers. This detection and restart will occur as soon as possible after the Server is deemed to be Failed.

This check will be controlled by these parameters:
HealthCheckIntervalSeconds=<number of seconds>
    The interval of time (in seconds) between which periodic scans are done by NM to check if Servers are Failed. Default is 180 seconds.

HealthCheckTimeoutSeconds=<number of seconds>
    The length of time (in seconds) the Node Manager will wait for a response to the health check query after which it will deem the monitored server Failed. Default is 60 seconds.

AutoKillIfFailedEnabled=<true|false>
    If a Server is deemed Failed, this parameter will control whether NM will kill the Server or not. Default is false.

The time that a Server takes to startup depends upon the applications being deployed on it. NM will wait for a Server to complete its startup before it (the NM) starts monitoring the Server. This wait time can be specified using the following parameter:

HealthCheckStartDelaySeconds=<number of seconds>
    The length of time (in seconds) the Node Manager will wait before starting its monitoring of the Server. Default is 120 seconds.

HealthCheckIntervalSeconds and HealthCheckTimeoutSeconds and parameters will be defined per NM, and can be specified on the NM command line.

AutoKillIfFailedEnabled and HealthCheckStartDelaySeconds parameters will be defined per Server instance and will be modifiable at runtime via the Admin Console. After NM has killed a Failed server, its restartability is controlled by the parameters defined in section 3.2 above.

3.3 External Interface Requirements

3.3.1 Software Interfaces (Javadoc, MBean, Objects, Classes)

This feature has only an administrative interface, and it is via the new command line arguments described in section 4.2.

These new parameters for the Server will be modifiable at runtime via the Admin Console.

These methods will be added to the ServerMBean to access or modify these parameters:
boolean getAutoKillIfFailedEnabled( );
void setAutoKillIfFailedEnabled(boolean);
int getHealthCheckStartDelaySeconds( );
void setHealthCheckStartDelaySeconds(int secs);

4. Node Manager Runtime MBeans

4.1 Functional Description

These MBeans will serve the following purposes:
1. Expose NM functionality to external administrative clients
    External administrative clients (3<sup>rd</sup> party application monitors, HA frameworks, etc.) need to be able to start and kill Servers using the NM. They should be able to do this programmatically without using the admin console.
    These MBeans will provide a programmatic interface to NM's functionality.
2. Expose NM's view of Server Health
    As described in section 4 above, NM periodically collects health information on Servers. Internal or external administrative clients (e.g., admin console) need to be able to access this information.
    These MBeans will provide an interface to this information.

4.2 Functional Requirements

The Admin Server will host the new "NodeManagerRuntimeMBean". There will be one NodeManagerRuntimeMBean per machine in the domain.

This MBean will offer methods that wrap NM functionality and expose the health information collected by NM.

The ServerLifecycleRuntimeMBean hosted on the Admin Server will use these MBeans internally. They will NOT be exposed to external JMX clients.

4.3 External Interface Requirements

4.3.2 Software Interfaces (Javadoc, MBean, Objects, Classes)

public interface NodeManagerRuntimeMBean extends WebLogic.management.runtime.RuntimeMBean Method Summary
java.io.Reader start(ServerMBean server) throws NodeManagerException;
 starts the specified Server.
 Returns Reader to local log file containing output of executed command. Throws NodeManagerException if any error occurs.
java.io.Reader startInStandby(ServerMBean server) throws NodeManagerException;
 starts the specified Server in Standby state.
 Returns Reader to local log file containing output of executed command. Throws NodeManagerException if any error occurs.
java.io.Reader shutdown(ServerMBean server) throws NodeManagerException;
 shuts down the specified Server.
 Returns Reader to local log file containing output of executed command. Throws NodeManagerException if any error occurs.
java.io.Reader kill(ServerMBean server) throws NodeManagerException;
 kills the specified Server. Used to kill the server process when the server does not respond to shutdown operation.
 Returns Reader to local log file containing output of executed command. Throws NodeManagerException if any error occurs.
java.io.Reader startMonitoring(ServerMBean server) throws NodeManagerException;
 Instruct NM to start monitoring the specified server. NM will automatically restart the server if
 it crashes (if AutoRestartEnabled is set to true) or gets into Failed state (if AutoKillIfFailedEnabled and AutoRestartEnabled are set to true).
 Returns Reader to local log file containing output of executed command. Throws NodeManagerException if any error occurs.
java.io.Reader stopMonitoring(ServerMBean server) throws NodeManagerException;
 Instruct NM to stop monitoring the specified server.
 Returns Reader to local log file containing output of executed command. Throws NodeManagerException if any error occurs.
java.io.Reader getLogs(ServerMBean server, String type) throws NodeManagerException;
 Get logs from the NM for the specified server. The type is either "WL_output" or "WL_error".
 Returns Reader to log retrieved. Throws NodeManagerException if any error occurs.
String getState(ServerMBean server) throws NodeManagerException;
 Query the NM for its view of specified server's state. Used when server does not respond to queries to its ServerRuntimeMBean.
 Will return "Unknown" if NM is either not monitoring or does not have any knowledge of the server. Throws NodeManagerException if any error occurs.

5.1 Node Manager—Managed Server communication

5.1.1 Health Monitoring Communication

NM will periodically poll the Server to check its health. The algorithm used in this polling is as follows:
1. Upon startup, NM reads an on-disk file to retrieve information on Servers it was monitoring during its previous incarnation.
    It assumes that all of the monitored Servers are alive when it starts up. It assumes no knowledge of their current States (i.e., it sets its view of their State to "Unknown").
2. NM invokes the NMCommandServlet deployed on the Server. This is an asynchronous Servlet that will return the Server's health information after HealthCheckIntervalSeconds have elapsed.
3. One of the following happens when NM invokes the Servlet:
 3.1 IOException is thrown.
    This could mean a number of different things:
    Server has crashed or is not running
    Server too busy to accept TCP connection
    Server has Failed, unable to accept TCP connection
    Transient IO exception
        All cases are treated as if Server has Failed. NM sets its internal value of Server state to "Failed".
        To handle "false negatives" NM kills the Server.

If the Server's AutoKillIfFailedEnabled parameter is "true", NM sets its internal value of Server state to "Failed" and kills the Server.

If AutoKillIfFailedEnabled is false, NM sets it internal value of Server state to "Failed Not Restartable", logs a warning and continues.

3.3 Server returns its State value after HealthCheckIntervalSeconds.
3.3.1 Server State is Running
    No action.
3.3.2 Server State is Failed
    If the Server's AutoKillIfFailedEnabled parameter is "true", NM sets its internal value of Server state to "Failed" and kills the Server.
    If AutoKillIfFailedEnabled is false, NM sets it internal value of Server state to "Failed Not Restartable", logs a warning and continues.

4. In the next iteration, if NM sees that its interval value of Server state is "Failed", it will try to restart the Server.

NM checks the Server's AutoRestartEnabled parameter. If it is true and less than RestartMax restarts have been done in the current RestartIntervalSeconds window, NM will restart the Server.

If Server has already been restarted RestartMax times in the current RestartIntervalSeconds window, NM will wait till the next RestartIntervalSeconds window begins before doing another restart.

If AutoRestartEnabled is false, NM will not restart the Server.

5.2.1 Server State Transition Notifications

When certain transitions occur in the Server's State value, it will inform the NM of them.

This will be particularly useful in the following cases:

When the NM starts a Server, there is currently no mechanism to determine if the Server started successfully or not. Now, the Server will inform the NM once it has entered a Standby State.

If a Server fails, NM will discover this only in the next iteration of its health-monitoring query. Now, the Server will inform the NM as soon as it has entered a Failed State.

Passing the NM's listening address to the Server when the latter is starting up will facilitate this communication.

Impact on JMX clients

In WLS 6.1, JMX clients (like the Admin Console) performed Server lifecycle operations by invoking methods on the Server configuration MBeans. In Acadia, these clients will be accessing the new Server Lifecycle MBeans for this purpose.

These new MBeans have a different interface than the Server configuration MBeans.

Detailed below are the changed semantics:

Operations such as "start" and "shutdown" will now return precise information on their success or failure. They will throw an exception if the operation fails. Look at [SLC] for details.

All operations on the Node Manager Runtime MBeans are now blocking. A TaskMBean interface is being provided around the Server Lifecycle MBeans to provide an asynchronous interface to JMX clients.

The new Server Lifecycle and Node Manager Runtime MBeans provide a rich set of functionality. JMX clients can make use of these to perform a wide variety of Server lifecycle and health monitoring control operations. Look at [SLC] and section 5.2.3 above for details on this.

5.3 NM-Server Lifecycle Interactions

Detailed below are the interactions between these two entities during each of the Server Lifecycle state transitions.

Admin console, weblogic.Admin command line utility and other Admin Clients will be effecting these state transitions by invoking methods on the ServerLifecycleRuntimeMBean.

1 start( ) [SHUTDOWN->RUNNING]
  startInStandby( ) [SHUTDOWN->STANDBY]
  ServerLifecycleRuntimeMBean hosted on the Admin Server will invoke the start( ) or startInStandby( ) methods on the corresponding NodeManagerRuntimeMBean.

2. shutdown( ) [STANDBY->SHUTDOWN]
  If a NM is configured, ServerLifecycleRuntimeMBean hosted on the Admin Server will invoke the shutdown( ) method on the corresponding NodeManagerRuntimeMBean. If not, it will invoke the shutdown( ) method on the ServerLifecycleRuntimeMBean hosted on the Managed Server.

3. getState( )
  ServerLifecycleRuntimeMBean hosted on the Managed Server will return the State attribute of the Server.
  ServerLifecycleRuntimeMBean hosted on the Admin Server will invoke the getState( ) method on the ServerLifecycleRuntimeMBean hosted on the Managed Server. If this operation times out, it will then invoke the getState( ) method on the NodeManagerRuntimeMBean.

6. Diffie-Hellman Based Authentication/Encryption Scheme

A Diffie-Hellman based Authentication/Encryption scheme was proposed as an alternative to the current X.509 Certificates based scheme.

After much discussion, it was decided that customers do not require this.

Detailed below is the proposal.

6.1 Functional Description

All data being sent over the network link between the Admin Server and NM will be encrypted using a new scheme based on the Diffie-Hellman algorithm. The encryption parameters will be negotiated at link establishment time and will depend upon configuration parameters and installed encryption software.

The Admin Server and NM will be authenticated with each other using a shared secret based mechanism.

6.2 Functional Requirements 6.2.1 Concepts and Definitions

Admin Server begins the communication session.

A NM receives the initial connection.

Both processes are aware of the encryption feature, and have two configuration parameters.

The first configuration parameter is the Minimum encryption level a process will accept. It is expressed as a key length: 0, 40, or 128 bits.

The second configuration parameter is the Maximum encryption level a process is willing to support. It also is expressed as a 0, 40, or 128 bit key size.

For convenience, this document will denote the two parameters as (min, max). So (40, 128) means a process will accept at least 40-bit encryption but desires 128-bit if possible.

Encryption parameters negotiated are for the lifetime of the communication session.

6.2.2 Encryption Key Size Negotiation

The first step is for the two processes to agree on the largest common key size supported by both. This negotiation itself need not be encrypted or hidden.

A pre-processing step temporarily reduces the maximum key size parameter configured to agree with the installed software's capabilities. This must be done at link negotiation time, because at configuration time it may not be possible to verify a particular machine's installed encryption package. For example, the administrator may configure (0, 128) encryption for an unbooted machine that only has a 40-bit encryption package installed. When the machine actually negotiates a key size, it should represent itself as (0, 40). In some cases this may cause a run-time error; for example (128, 128) is not possible with a 40-bit encryption package.

The following table shows how the configured parameters are modified based on which encryption package is installed.

This is a local computation that each process performs itself. The result serves as input for the subsequent cross-machine negotiation.

| configured parameters (min, max) | no encryption package installed | 40-bit encryption package installed | 128-bit encryption package installed |
|---|---|---|---|
| 0, 0 | 0, 0 | 0, 0 | 0, 0 |
| 0, 40 | 0, 0 | 0, 40 | 0, 40 |
| 0, 128 | 0, 0 | 0, 40, | 0, 128 |
| 40, 40 | error | 40, 40 | 40, 40 |
| 40, 128 | error | 40, 40 | 40, 128 |
| 128, 128 | error | error | 128, 128 |

Next the two processes jointly agree on the largest key size acceptable to both. It may be that there is no overlap, in which case network link establishment fails (with an appropriate log error message).

This table shows the outcome for all possible combinations of min/max parameters:

|  | 0, 0 | 0, 40 | 0, 128 | 40, 40 | 40, 128 | 128, 128 |
|---|---|---|---|---|---|---|
| 0, 0 | 0 | 0 | 0 | error | error | error |
| 0, 40 | 0 | 40 | 40 | 40 | 40 | error |
| 0, 128 | 0 | 40 | 128 | 40 | 128 | 128 |
| 40, 40 | error | 40 | 40 | 40 | 40 | error |
| 40, 128 | error | 40 | 128 | 40 | 128 | 128 |
| 128, 128 | error | error | 128 | error | 128 | 128 |

6.2.3 Session Key Agreement

Two session keys will be generated for the encrypted network link using the Diffie-Hellman algorithm. One session key will be used for data flowing from the Admin Server to the NM, and the other key will be used for traffic flowing in the reverse direction. The generated session keys will always be 128-bit.

Input parameters to the Diffie-Hellman key agreement algorithm will be fixed (burned-in to WebLogic software). Admin Server will transmit the parameters it wants to use to the NM. This permits the burned-in parameters to be changed in future releases.

The actual Diffie-Hellman parameters to burn-in for the first release of this feature are shown in Appendix A.

Diffie-Hellman session key agreement also requires a cryptographically secure pseudo-random number source. The seed value for the pseudo-random number generator must contain a large amount of unpredictable data, so that a network-based attacker cannot iterate through likely seed values.

6.2.6 40-bit Protocol Requirements

If a 40-bit key size is negotiated, the 128-bit session key produced by Diffie-Hellman should be used for RC4 bulk encryption. However, 88 bits must be disclosed in the clear in one of the link establishment messages. This allows an attacker to conduct a 40-bit brute-force key search. Security is better than with a simple 40-bit key, because the 88-bits act as salt and prevent an attacker from using pre-computed lookup tables.

A network attacker may not be permitted to defeat the 88-bit disclosure requirement by tampering with packets or deleting packets:

The actual bits disclosed in the clear must be used by the Admin Server. If they do not agree with the locally computed Diffie-Hellman session key, or are not supplied as expected, Admin Server will generate a log error message and terminate the connection.

Both the processes implicitly agree to permute their Diffie-Hellman session key when 40-bit encryption is negotiated, as shown below. This prevents a network attacker from tampering with messages and tricking the Admin Server into a 128-bit session when 40-bit was the NM s negotiation result.

6.2.7 Authentication Protocol

To guard against a Man-in-the-Middle attack, Admin Server and NM will be authenticated using a shared secret, as follows:

Both processes will generate a 128-bit MD5 message digest (fingerprint) using the send and receive session keys negotiated (see Section 6.2.3 above)

Admin Server will generate a 64-bit random number (challenge). It will then DES-encrypt the challenge and the fingerprint using its password as the key and send this to the NM.

NM will decrypt the received message with the Admin Server s password. If the fingerprints don t match, it will reject the authentication request.

NM will generate a 64-bit session key. NM will then DES-encrypt the previously-received challenge, the generated session key and the fingerprint using its password as the key and send this to the Admin Server.

Admin Server will decrypt the received message with the NM s password. It will check the received challenge and fingerprint with its local values. If either doesn't match, it will reject the authentication request.

If the above sequence is completed successfully, Admin Server and NM will be considered authenticated with each other.

6.3 External Interface Requirements

6.3.1 Hardware Interfaces (O)

6.3.2 Software Interfaces (Javadoc, MBean, Objects, Classes)

These new command line arguments will be specified for the Admin Server.

WebLogic.management.minEncryptionBits=<number>
the Minimum encryption level the process will accept. Possible values are 0, 40, 128. Default value is 0.

WebLogic.management.maxEncryptionBits=<number>
the Maximum encryption level the process will accept. Possible values are 0, 40, 128. Default value is 128.

WebLogic.management.enableChannelBinding=0|1 a value of 1 enables the Authentication Protocol (Section 5.2.7). Default is 0.

WebLogic.management.passwordKey=<string> key to be used to decrypt the encrypted NM passwords stored in the configuration file.

It must be specified if WebLogic.management.enableChannelBinding is set to 1.

The utility WebLogic.wtc.gwt.genpasswd will be used to encrypt NM passwords to be stored in the configuration file.

These new command line arguments will be specified for the NM.

WebLogic.nodemanager.minEncryptionBits=<number>
the Minimum encryption level the process will accept. Possible values are 0, 40, 128. Default value is 0.

WebLogic. nodemanager.maxEncryptionBits=<number>
the Maximum encryption level the process will accept. Possible values are 0, 40, 128. Default value is 128.

WebLogic.nodemanager.enableChannelBinding=0|1 a value of 1 enables the Authentication Protocol (Section 5.2.7). Default is 0.

WebLogic. nodemanager.password=<string> the NM s password.

Must be specified if WebLogic.nodemanager.enableChannelBinding is set to 1.

WebLogic.nodemanager.adminServerPassword=<string> the Admin Server s password.

Must be specified if WebLogic.nodemanager.enableChannelBinding is set to 1.

These new arguments will be modifiable at runtime via the Admin Console.

The invention claimed is:

1. A method of monitoring the health of a server comprising:
   registering a sub-system of the server with a server health monitor;
   monitoring the sub-system by the server health monitor;
   receiving a health update from the sub-system to the server health monitor wherein the health update provides information regarding the health of the sub-system;
   determining health of the server by the server health monitor based at least in part upon the health update received from monitoring the sub-system;
   performing a corrective action upon the sub-system, wherein the corrective action is based on the health of the sub-system; and
   wherein a parameter specifies the maximum number of times the server can be restarted within a period of time specified by another parameter.

2. The method as claimed in claim 1 further comprising:
   configuring the sub-system to be monitored by the server; and
   transmitting information to the server health monitor indicating the sub-system is to be monitored by the server health monitor.

3. The method as claimed in claim 2 wherein said configuring the sub-system includes configuring a MBean residing in the sub-system.

4. The method as claimed in claim 1 wherein said monitoring the sub-system includes:
   detecting a triggering event; and
   performing a health status update on the sub-system by the sub-system, the sub-system determining a health information for the sub-system as a result of the health status update; and
   processing the health information.

5. The method as claimed in claim 4 wherein the triggering event is a change in the status of the sub-system.

6. The method as claimed in claim 4 wherein the triggering event is an event occurring external to the sub-system, and the occurrence of the event is communicated to the sub-system.

7. The method as claimed in claim 4 wherein said monitoring the sub-system further comprises:
   providing sub-system health information to an entity, the entity having requested the sub-system's health information from the sub-system.

8. The method as claimed in claim 2 further comprising:
   performing shutdown of the sub-system, and the sub-system unregistering from being monitored by the server health monitor.

9. The method of claim 1, wherein a node manager enables an administrator to start and kill servers remotely.

10. The method of claim 1, wherein a health update indicates that the sub-system is at one of multiple pre-defined health levels.

11. The method of claim 10, wherein health levels correspond to conditions, the conditions including good, failed, and between good and failed.

12. The method of claim 10, wherein the sub-system is set to the critical level if a minimum number of transactions have timed out.

13. The method of claim 1, wherein the health update is triggered periodically by a counter.

14. The method of claim 1, wherein the server health monitor determines that the server has failed if any critical sub-system has failed.

15. The method of claim 1, wherein the server health monitor determines that a sub-system has failed if the sub-system fails to respond.

16. The method of claim 1, wherein the server health monitor can shut down a failed sub-system.

17. The method of claim 1, wherein the server health monitor can shut down the server if a critical sub-system failed.

18. The method of claim 1, wherein all communication between a node manager and an administrative server is encrypted.

19. The method of claim 1, wherein the sub-system performs a health check upon itself and provides sub-system health information to requesting entities.

20. The method of claim 1, wherein the sub-system health updates are triggered by external entity requests, internal events such as counters, or changes in status.

* * * * *

UNITED STATES PATENT AND TRADEMARK OFFICE
CERTIFICATE OF CORRECTION

| | | |
|---|---|---|
| PATENT NO. | : 7,849,368 B2 | |
| APPLICATION NO. | : 12/100970 | |
| DATED | : December 7, 2010 | |
| INVENTOR(S) | : Rahul Srivastava et al. | |

It is certified that error appears in the above-identified patent and that said Letters Patent is hereby corrected as shown below:

In column 2, line 20, delete "effect" and insert -- affect --, therefor.

In column 12, line 61, delete "NM s" and insert -- NM's --, therefor.

In column 13, line 54, delete "WebLogic. nodemanager" and insert -- WebLogic.nodemanager --, therefor.

In column 13, line 55, delete "NM s" and insert -- NM's --, therefor.

In column 18, line 49, after ""false negatives"" insert -- , --.

In column 19, line 58, delete "1" and insert -- 1. --, therefor.

In column 22, line 8, delete "NM s" and insert -- NM's --, therefor.

In column 22, line 23, delete "Server s" and insert -- Server's --, therefor.

In column 22, line 23, delete "don t" and insert -- don't --, therefor.

In column 22, line 30, delete "NM s" and insert -- NM's --, therefor.

In column 22, line 65, delete "WebLogic. nodemanager" and insert -- WebLogic.nodemanager --, therefor.

In column 23, line 4, delete "WebLogic. nodemanager" and insert -- WebLogic.nodemanager --, therefor.

In column 23, line 4, delete "NM s" and insert -- NM's --, therefor.

Signed and Sealed this
Twenty-third Day of August, 2011

David J. Kappos
*Director of the United States Patent and Trademark Office*

CERTIFICATE OF CORRECTION (continued)
U.S. Pat. No. 7,849,368 B2

In column 23, line 9, delete "Server s" and insert -- Server's --, therefor.